United States Patent [19]

Hoffmann et al.

[11] Patent Number: 5,189,903
[45] Date of Patent: Mar. 2, 1993

[54] SLIDING STRIP FOR COLLECTOR WITH RUPTURE DETECTION DEVICE

[75] Inventors: Peter Hoffmann, Steeg; Johann Hoell, Hallstatt; Herbert Grabner; Klaus Reiser, both of Bad Ischl, all of Austria

[73] Assignee: Hoffmann & Co. Elektrokohle Gesellschaft mbH, Steeg, Austria

[21] Appl. No.: 623,384

[22] PCT Filed: May 23, 1989

[86] PCT No.: PCT/EP89/00563

§ 371 Date: Dec. 17, 1990

§ 102(e) Date: Dec. 17, 1990

[87] PCT Pub. No.: WO89/11408

PCT Pub. Date: Nov. 30, 1989

[30] Foreign Application Priority Data

May 25, 1988 [DE] Fed. Rep. of Germany ....... 3817743

[51] Int. Cl.[5] ............................ G01M 3/26; B60L 5/20
[52] U.S. Cl. ............................................. 73/40; 73/37; 191/87
[58] Field of Search ............................ 73/40, 37, 49.2; 191/87

[56] References Cited

U.S. PATENT DOCUMENTS 4,578,546  3/1986  Ferguson .............................. 191/87

FOREIGN PATENT DOCUMENTS 2829396  1/1980  Fed. Rep. of Germany .
8716985  2/1988  Fed. Rep. of Germany .
8803377  5/1988  Fed. Rep. of Germany .
3905962  4/1990  Fed. Rep. of Germany ........ 191/87
1374972  11/1974  United Kingdom .

Primary Examiner—Hezron E. Williams
Assistant Examiner—Joseph W. Roskos
Attorney, Agent, or Firm—Townsend and Townsend

[57] ABSTRACT

A carbon sliding strip for a collector has a rupture control device, comprising a pressure line (9) incorporated directly in the carbon strip (1), a device (13) for producing increased pressure in the pressure line and a pressure detector (15), which detects the sudden drop in pressure which occurs if the channel begins to leak. Since at least part of pressure line wall is made directly from the carbon material, the pressure control device responds even to small cracks in the carbon and immediately shows wear and rupture.

14 Claims, 1 Drawing Sheet

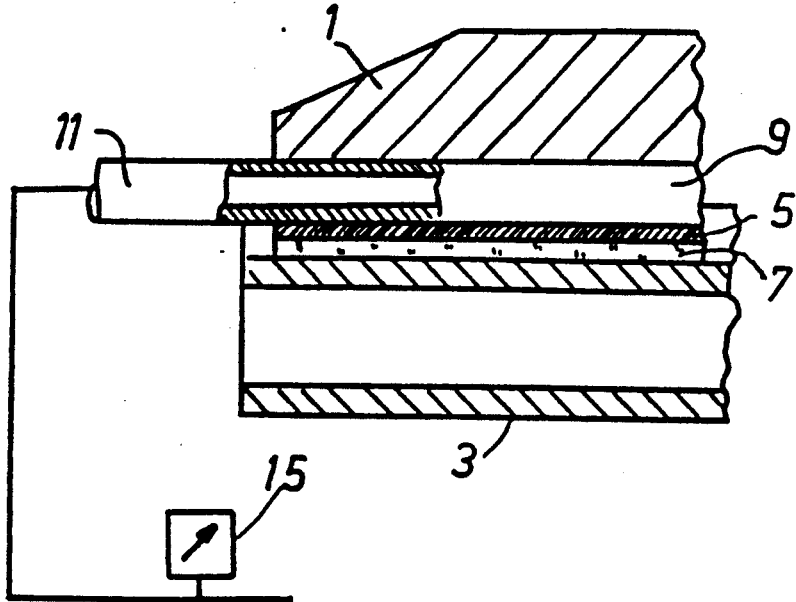
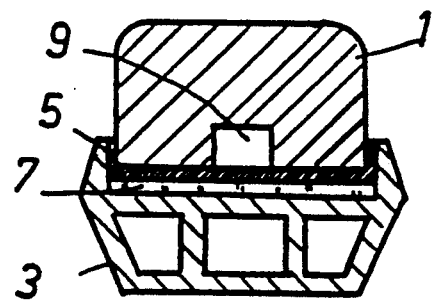
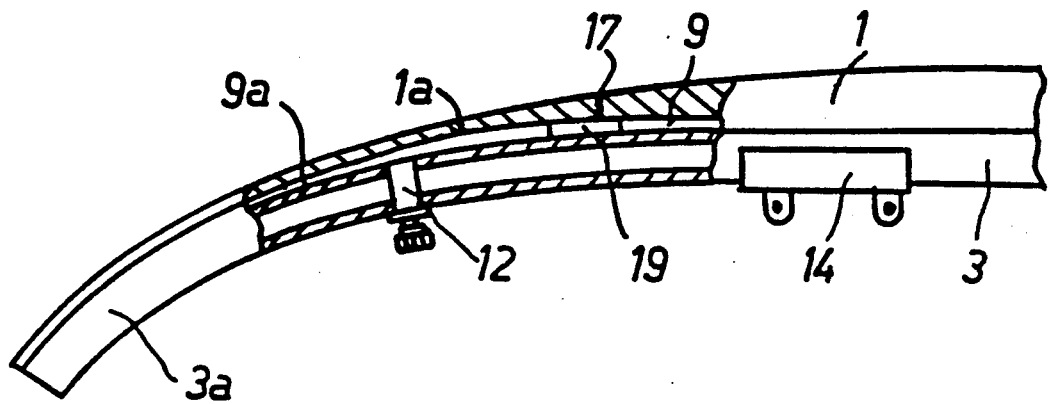

SLIDING STRIP FOR COLLECTOR WITH RUPTURE DETECTION DEVICE

The present invention relates to a sliding strip for a collector comprising a carbon strip mounted on a carrier and a rupture or crack detection device for sensing ruptures or wear in the carbon strip.

It is essential to take modern collectors out of service as quickly as possible when their carbon sliding strips are damaged by wear or cracking. Thus, a rupture detector known from U.S. Pat. No. 4,578,546, for example, automatically lowers the collector when wear or a rupture in the sliding strip is detected. Wear or cracking in the carbon sliding strip is detected by placing an internally pressurized hose inside the sliding strip which extends in the longitudinal direction of the strip. Damage to the hose results in a sudden pressure drop which is used for triggering an alarm or automatically lowering the collector.

However, such conventional pressure controllers have not been sufficiently reliable. The hose does not necessarily wear down with the carbon strip and cracks in the strip are either not sensed at all or they are sensed with a time delay.

It is therefore an object of the present invention to provide an improved carbon sliding strip of the aforementioned kind in which excessive wear and cracking of the carbon are detected instantaneously and with greater reliability.

The objective is achieved as set forth in claim 1. The subclaims relate to further advantageous embodiments of the invention.

The pressure conduit of the present invention is not formed by a hose but directly by the carbon strip material or a coating applied thereto. Hence, the pressure conduit will begin to leak due to a rupture of or even a thin crack in the carbon, wear of the carbon strip, or when the strip is jolted loose from its carrier. In each case there is a rapid pressure drop which either triggers a warning signal in the conventional manner and/or is utilized to automatically lower the collector. The degree of responsiveness may be controlled by appropriately varying the thickness of a coating applied to the walls of the pressure conduit.

Embodiments of the present invention are described with reference to the drawings, in which:

FIG. 1 is a schematic end view, in cross-section, of a sliding strip constructed according to the present invention;

FIG. 2 shows a front view, in cross-section, of the sliding strip of the present invention with a rupture detection device connected thereto; and FIG. 3 shows an end portion of a sliding strip constructed in accordance with another embodiment of the present invention.

FIGS. 1 and 2 show a sliding strip made of a carbon strip 1 and a carrier 3 for the requisite mechanical strength and which is also used on conventional collectors as a conductor. A copper layer 5 is galvanically applied to the underside of carbon strip 1 which is cemented to carrier 3 by means of an adhesive layer 7. For purposes of illustration the thickness of both copper layer 5 and adhesive layer 7 are exaggerated in FIGS. 1 and 2.

A groove 9 is milled or press formed into the underside of carbon strip 1. Copper layer 5 bridges over groove 9 to define an air-tight pressure conduit enclosed on three sides by the carbon and on a fourth side by copper layer. The interior walls of the groove formed by the carbon may also have an air-tight coating of, for example, a thin lacquer or a pyrolytically applied carbon layer.

As seen in FIG. 2, at one end of the carbon strip, a hose 11 is cemented into pressure channel 9. A compressed air pressure line from a source, such as, for example, a compressed air tank 13, is connected to the hose and the pressure in channel 9 is monitored with a sensor 15. At the other end of carbon strip 1 (not shown in FIG. 2) pressure channel 9 is sealed in a suitable manner.

When the material of which carbon strip 1 is made becomes worn, damaged or ruptures, a leak occurs in pressure channel 9, producing a drop in pressure which is measured by a pressure sensor 15. Pressure sensor 15 may function in a conventional manner to trigger a warning signal and/or to disengage the collector.

Though not shown in the present embodiment, the galvanically applied copper layer 5 may also cover the walls of groove 9. Here too, the advantages of the present invention are realized because excessive wear or a rupture of the carbon immediately damages the thin copper layer, thereby causing it to leak.

Carbon strip 1 together with pressure channel 9 is preferably made utilizing the following advantageous method. A groove 9 is milled into the undersurface of carbon strip 1 and is then filled with a material so that it is flush with the undersurface. Plastic materials are ideally suited as a filler, e.g. in the form of a plastic strip that is laid into groove 9. Next, a copper layer 5 is galvanically applied to the undersurface of carbon strip 1. It expands across and completely bridges over the filler disposed in groove 9. It is advantageous to select a filler that adheres poorly to the copper layer. After the copper layer is applied, the plastic or other filler material is removed, e.g. by pulling it out of or melting it in groove 9, leaving behind an airtight pressure conduit 9.

In a modified embodiment of the present invention a copper layer 5 is applied on each side of groove 9 and, if desired, to the interior walls of the groove, but it does not bridge over the groove. In this case the portion of the groove 9 facing carrier 3 remains open and it is sealed off when the carrier is cemented to carbon strip 1, thereby forming an airtight seal. An advantage of this embodiment is that the detector 15 also senses a separation or leakage occurring at any given point along the adhesive connection between carbon strip 1 and carrier 3.

In the embodiment of FIG. 3 the carrier is constructed with side sections in the form of curved, horn-like extensions 3a for guiding an electric wire approaching the collector from the side towards the center portion of the sliding strip. Carbon strip 1, with the pressure channel 9 described above, is placed over the straight or only slightly curved center section of carrier 3. Extensions 3a are also covered with a carbon layer 1a to provide wear protection. Each layer 9a is considerably thinner than carbon strip 1 and is preferably manufactured and applied separately from carbon strip 1. An adhesive joint 17 connects the two and forms an airtight seal. A pressure conduit 9a is also formed within each layer 1a and is connected to pressure conduit 9 of carbon strip 1 with a hose section 19 that bridges joint 17. Pressure channel 9a of layer 1a, and with that pressure channel 9 of carbon strip 1, are joined by means of a fitting 12 to a compressed air tank (not shown) and to a pressure sensor. A connector 14 serves, for example, to secure the sliding strip, to the pantographs of the collector, and to establish electrical contacts.

What is claimed is:

1. A sliding strip for a collector comprising:
   a carrier;
   a carbon strip supported on said carrier; and
   a monitoring device for detecting rupture or wear of said carbon strip, said monitoring device comprising:
   an elongated gas-tight channel formed in said carbon strip along the length thereof, the channel being defined over at least part of its circumference by walls formed by said carbon strip and a layer of gas-tight material secured to the carbon strip and forming a remaining part of the circumference of the channel;
   means for maintaining an elevated air or gas pressure in said channel; and
   a detector for signalling a drop of said pressure.

2. A sliding strip as claimed in claim 1 including a groove formed in an underside of the carbon strip defining the pressure channel and having an open side adjacent the carrier, and wherein the carbon strip further comprises a metal layer attached to the underside of the carbon strip thereby overlaying the groove and sealing the open side of the groove.

3. A sliding strip as claimed in claim 1 including a groove formed in an underside of the carbon strip having an open side adjacent the carrier, and wherein said carbon strip is cemented to the carrier so that an airtight seal is formed across the open side of said groove.

4. A sliding strip according to claim 1 wherein the carrier has curved or angularly inclined extensions fitted with layers of carbon, and in that each carbon layer includes a pressure conduit connected to the rupture monitoring device and having interior walls defined at least partially by a material, if desired, coated, of which the carbon layer is made.

5. A sliding strip according to claim 4 wherein the layers of carbon consist of carbon sections which are independent of the carbon strip, and a connecting tube linking the pressure conduit in each layer with the pressure conduit of the carbon strip.

6. A sliding strip for a collector comprising:
   a carrier;
   a carbon strip supported on said carrier; and
   a monitoring device for detecting rupture or wear of said carbon strip, said monitoring device comprising:
   an elongated gas-tight channel formed in said carbon strip along the length thereof, the channel being defined over at least part of its circumference by walls formed by said carbon strip and a coating applied to the carbon strip, said coating including a chosen one of pyrolytically applied carbon or of galvanically applied metal;
   means for maintaining an elevated air or gas pressure in said channel; and
   a detector for signalling a drop of said pressure.

7. A sliding strip as claimed in claim 6 including a thin, gas impervious layer made of a material chosen from the group consisting of lacquer, pyrolytic carbon and/or metal and applied to the walls which are formed by the carbon strip and which define part of the pressure conduit.

8. A sliding strip as claimed in claim 2 including a groove formed in an underside of the carbon strip having an open side adjacent the carrier, and wherein said carbon strip is cemented to the carrier so that an airtight seal is formed across the open side of said groove.

9. A sliding strip according to claim 6 wherein the carrier has curved or angularly inclined extensions fitted with layers of carbo, and in that each carbon layer includes a pressure conduit connected to the rupture monitoring device and having interior walls defined at least partially by a material, if desired, coated, of which the carbon layer is made.

10. A sliding strip according to claim 9 wherein the layers of carbon consist of carbon sections which are independent of the carbon strip, and a connecting tube linking the pressure conduit in each layer with the pressure conduit of the carbon strip.

11. A method of producing a carbon strip for a sliding strip comprising the following steps:
    forming a groove in an underside of a carbon strip;
    filling the groove with a filler material so that said filler material is flush with the underside of said carbon strip;
    galvanically applying a metal layer to the underside of said carbon strip and said filler material; and
    removing said filler material from said groove.

12. A method as claimed in claim 11 including the step of pyrolytically applying a carbon coating to the interior surfaces of the groove prior to insertion of the filler material.

13. A method as claimed in claim 11 including the step of galvanically applying a metal coating to the interior surfaces of the groove prior to insertion of the filler material.

14. A method as claimed in claim 11 wherein the filler material is preferably removed from said groove by longitudinal extraction from or melting it out of said groove.

* * * * *